United States Patent [19]
Kazanecki

[11] 3,881,078
[45] Apr. 29, 1975

[54] DE-ACCELERATION SWITCH OPERABLE BY RELEASE OF FORCE ON ACCELERATOR PEDAL

[75] Inventor: Paul J. Kazanecki, Brooklyn, N.Y.

[73] Assignee: The Raymond Lee Organization, Inc., New York, N.Y. ; a part interest

[22] Filed: Jan. 15, 1974

[21] Appl. No.: 433,541

[52] U.S. Cl. .............................................. 200/61.89
[51] Int. Cl. ........................ H01h 3/14; H01h 13/52
[58] Field of Search....... 200/61.53, 61.58 R, 61.89, 200/82 R, 82 C, 82 D, 82 DA, 153 LA, 86.5, 159 A, 161, 237, 239, 242, 83 J, 16 A, 61.86, 61.91; 340/52 R, 52 B, 69–72

[56] References Cited
UNITED STATES PATENTS

| | | | |
|---|---|---|---|
| 1,738,755 | 12/1929 | Blackmore | 200/159 A X |
| 1,846,513 | 2/1932 | Douglas | 200/61.89 X |
| 1,919,206 | 7/1933 | Douglas | 200/61.89 X |
| 2,222,765 | 11/1940 | Geyer | 200/161 X |
| 2,716,678 | 8/1955 | Randol | 200/61.89 |
| 3,105,884 | 10/1963 | Cottrell | 200/61.89 |

Primary Examiner—James R. Scott
Attorney, Agent, or Firm—Howard I. Podell

[57] ABSTRACT

A motion oriented electrical switch which may be employed to activate an exterior warning light on the rear of an automobile to indicate when de-acceleration of the automobile occurs. The switch is in bearing contact with linkage of the accelerator pedal of the vehicle and is fitted with NC electrical contact members held together by frictional engagement with a coil spring. The switch operator rod is in frictional engagement with a slidable member that permits the operator rod to move freely in the direction which maintains the switch contacts in the open position, but the frictional engagement of the slidable member to the operator rod causes the slidable member to bear against, and close the contact points of the switch, once the operator rod moves under the force of the coiled spring in the closing direction, with the switch contacts remaining closed until direction of motion of the operator rod is reversed.

1 Claim, 4 Drawing Figures

3,881,078

DE-ACCELERATION SWITCH OPERABLE BY RELEASE OF FORCE ON ACCELERATOR PEDAL

SUMMARY OF THE INVENTION:

This invention relates to a motion oriented switch, which may be connected to the accelerator pedal linkage of a vehicle and wired to a rear tail warning light. When the driver relaxes pressure on the accelerator pedal of an attached vehicle so as to permit de-acceleration of the vehicle, the connected rear tail warning light serves to notify following drivers.

An advantage of the use of this invention is that it controls an early warning system to following drivers of the attached vehicle.

A further advantage of the switch of this invention is that it remains in the open electrical position during all lengths of travel in the open direction of the operator rod of the switch, but switches to the closed electrical position at the outset of reverse direction of travel of the operator rod. When the operator rod is motionless, the switch remains in the closed or open position to which it has been set by the direction of previous travel of the operator rod.

Thus, when linked to the accelerator linkage of a vehicle, the switch remains in the open position while the vehicle is accelerating or maintained at a uniform rate of fuel feed, but the switch completes the electrical circuit to a warning light as soon as the driver of the vehicle reduces the amount of fuel to the engine, regardless of whether or not, the accelerator pedal linkage is completely released by the driver.

BRIEF DESCRIPTION OF THE DRAWING:

The objects and features of the invention may be understood with reference to the following detailed description of an illustrative embodiment of the invention, taken together with the accompanying drawings in which.

Figure 1:
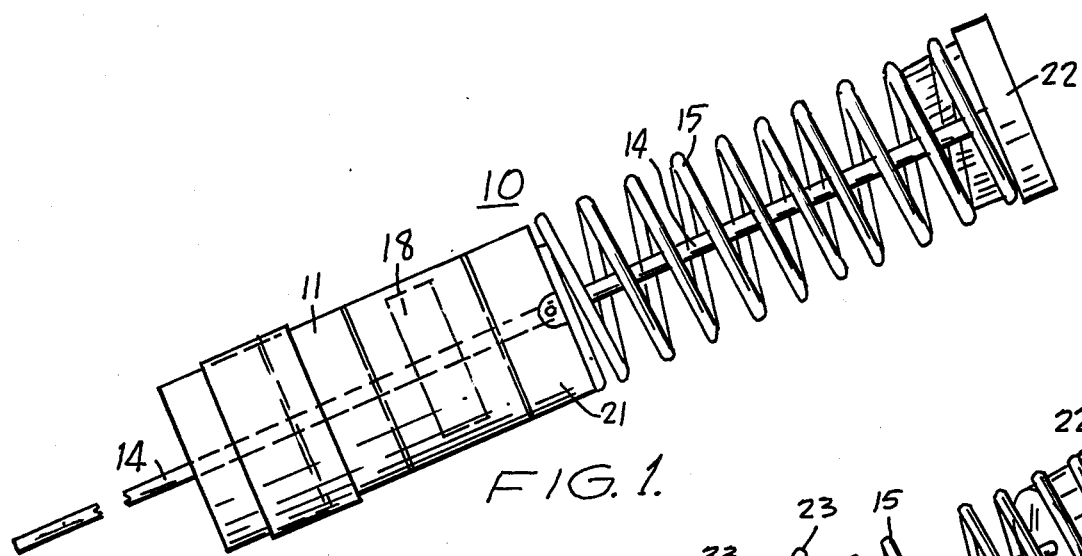
FIG. 1 illustrates a perspective view of the invention.
Figure 2:
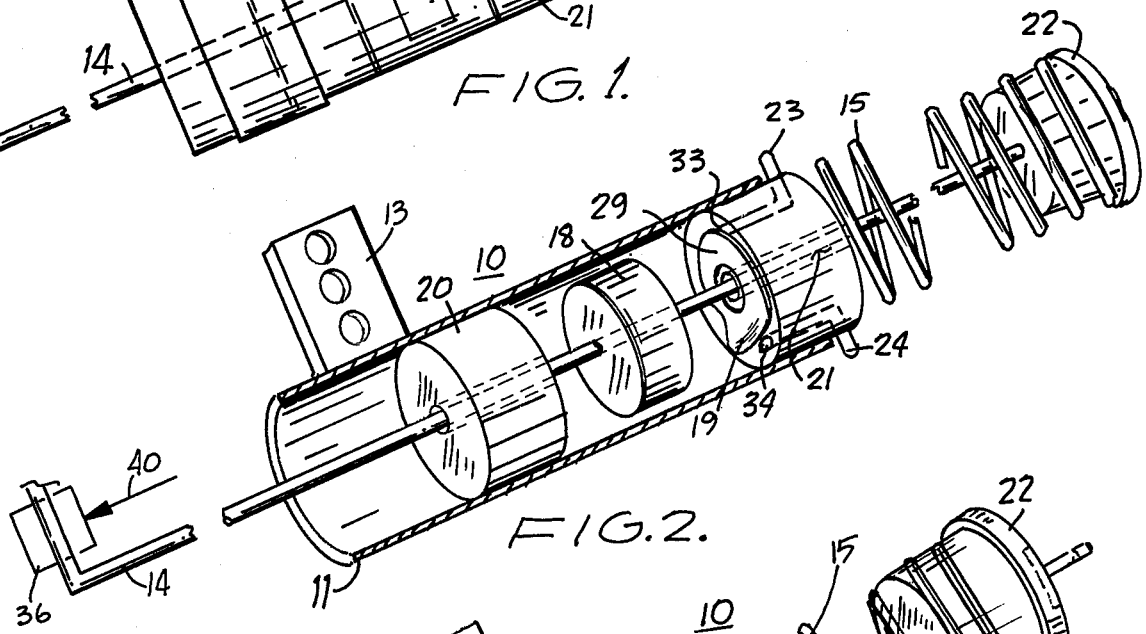
FIG. 2 illustrates an exploded sectional view of the invention.
Figure 3:
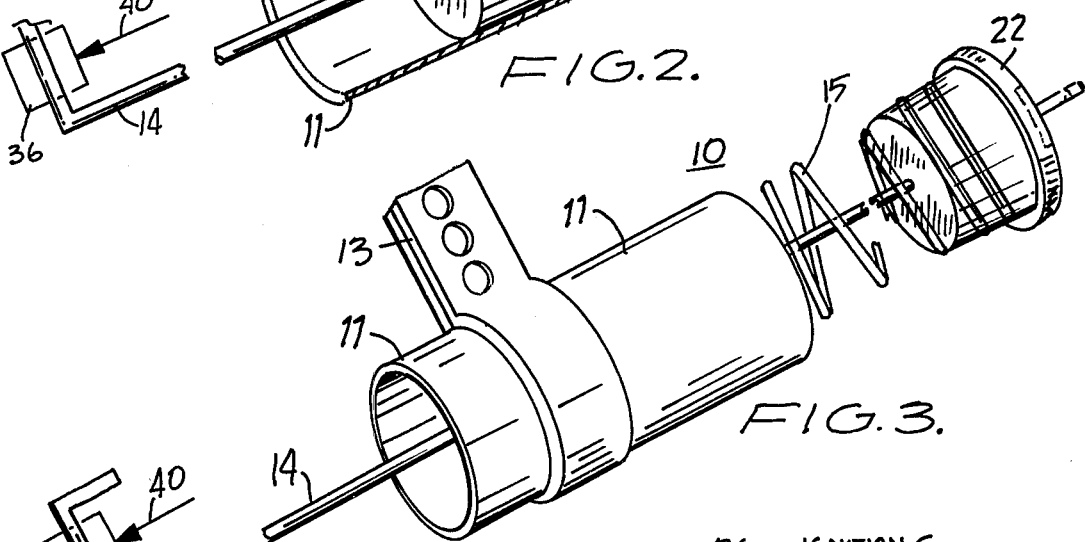
FIG. 3 illustrates a perspective view of the invention.
Figure 4:
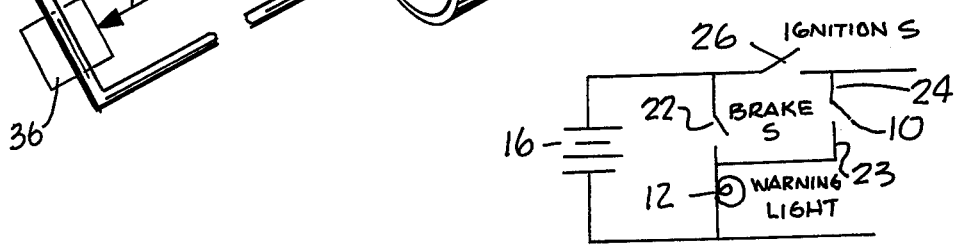
FIG. 4 illustrates a schematic diagram of a circuit to control a vehicle warning light.

DESCRIPTION OF THE PREFERRED EMBODIMENT:

Turning now descriptively to the drawing in which similar reference characters denote similar elements throughout the several views, FIGS. 1–3 illustrate the component parts of the motion orientation switch 10. Housing 11 of the switch 10 onto an automobile member in a position to permit bearing of the switch operator rod 14 against the accelerator pedal linkage 40 in the installed vehicle.

The pedal linkage 40 is fastened in bearing contact with sleeve 36 of operator rod 14 so as to move operator rod sleeve 36 and operator rod 14 in an axial direction away from the switch housing 11, when the accelerator pedal linkage 40 is moved to increase the rate of fuel feed.

Travel of the accelerator pedal linkage 40 in the direction of reducing the rate of fuel feed releases the bearing pressure against sleeve 36 and causes compression spring 15 to move operator rod 14 in the axial direction towards spring 15. At the outset of such motion of the operator rod 14, the switch contacts 19 and 34 become closed. Contacts 19 and 34 remain closed until the operator rod 14 is moved in the opposite direction by the effect of increased bearing pressure and motion of the accelerator linkage in the direction which increases the rate of fuel feed.

Switch contact 34 forms one end of a metal connector 24 which is fixed and embedded in an insulator 21. Insulator 21 is fixed to the interior of housing 11, and operator rod 14 freely slides through a central hole in insulator 21.

Switch control washer 29 is joined to a metal connector 33 embedded in insulator 21 with contact washer 29 lying on the interior surface of insulator 21 so that it does not touch switch contact 34 except when axial pressure is applied to curved lip 19 of contact washer 29 to force lip 19 into bearing engagement with contact 34.

Bearing pressure against lip 19 of washer 29 is maintained by insulated bearing washer 18, when washer 18 is moved by rod 14 towards contact washer 29 to press lip 19. Bearing washer 18 is frictionally mounted on rod 14 so as to be capable of sliding in either axial direction on rod 14 under a relatively high degree of friction.

Rod 14 is fixed at its end to cap 22, with coiled compression spring 15 located so as to bear between cap 22 and the end of the housing 11.

External electric connections are made to the external conductors 23 and 24 which are in electrical contact internally with NC switch contacts 19 and 34 respectively.

In the preferred embodiment, the switch 10 is connected in parallel with the switch 22 of the warning light 12, with switch 10 being in series with the ignition switch 26 so that it operates only when the ignition switch 26 is in the ON position.

The amount of play in the movement of bearing washer 18 with relation to rod 14 is determined by the axial space between the contact washer 29 mounted on insulator 21 and the inside face of insulator 20. Rod 14 moves freely through insulator 20 and insulator 21, both of which are fixed to the switch housing 11.

At the position of full travel of rod 14 in the closed switch position, bearing washer 18 is compressed against contact washer 29. Axial movement of rod 14 in the opening direction moves bearing washer 18 away from bearing contact with contact washer 29, opening the switch contacts, and bringing bearing washer 18 into engagement with insulator 20. Further axial movement of rod 14 to the full open position occurs with bearing washer 18 sliding in frictional engagement with respect to rod 14.

At the outset of reverse axial movement of rod 14 towards the closed position, bearing washer 18 is moved by rod 14 towards contact washer 29 and closes switch contacts 19 and 34 after rod 14 has moved the distance that initially separated washer 18, when it was resting against insulator 20, to the position of washer 18 when it bears against contact washer 29. Further travel of rod 14 in this closing direction may occur with washer 18 offering only frictional resistance to the full travel of rod 14.

In contrast, conventional limit switches switch ON or OFF at the same approximate location of the operator rod. A conventional limit switch fastened to an accelerator pedal linkage would switch OFF as soon as the accelerator pedal was moved from the idle position to a fuel feed position, but such a conventional switch would not switch ON until the accelerator pedal had returned to the idle position, and would not indicate during the period when the accelerator pedal was moved from the full throttle position to a lesser throttle position.

It will be obvious that the switch of this invention may be employed in many other circuit applications where the direction of motion of the operator rod is to be indicated. The switch may be readily modified by the addition of other contact washers to serve as a double throw switch or as a multiple pole switch or both.

Since obvious changes may be made in the specific embodiment of the invention described herein, such modifications being within the spirit and scope of the invention claimed, it is indicated that all matter contained herein is intended as illustrative and not as limiting in scope.

What I claim is:

1. An electrical switch which indicates direction of motion of the switch operator rod comprising:

a switch housing fitted with two spaced bearing members which are fixed with relation to each other and to the housing, a switch operator rod which is slidably mounted to both spaced bearing members so as to slide freely with relation to both spaced bearing members, said operator rod extending beyond the housing in at least one direction, a pressure member which is mounted on the operator rod between the two spaced bearing members, said pressure member being in frictional engagement with the operator rod so as to be capable of sliding under frictional resistance with relation to the operator rod, and switch contacts located on one of the bearing members which is of insulated material, so that said contacts are joined to each other when subjected to bearing pressure by the pressure member, said switch contacts being free of electrical contact with each other when not under bearing pressure of the pressure member, such that motion of the operator rod in one axial direction will move the pressure member against the contacts to cause the switch contacts to close, with motion of the rod in the reverse direction moving the pressure member away from the contacts causing the switch contacts to open, with said operator rod free to continue to move further in either direction in frictional sliding engagement with the pressure member after setting the switch contacts, said switch contacts including a fixed contact mounted in one of the spaced bearing members so as to be exposed along the plane of the interior face of said bearing member, and a spring contact member mounted on the interior face of said bearing member, said spring contact member shaped in the general form of a circular washer with one section of the lip of said contact member bent away from the interior face of the bearing member, said spring contact member oriented with respect to the fixed contact member so that the lip of the spring contact member is aligned in the axial direction of the operator rod with the exposed section of the fixed contact member, such that axial pressure of the pressure member against the bent lip of the spring contact member in the direction of the fixed contact member serves to bend the lip to engagement with the fixed contact member, with said lip springing away from engagement with the fixed contact member when the spring contact member is free of engagement with the pressure member.

* * * * *